(12) United States Patent
Laporte

(10) Patent No.: US 8,543,074 B1
(45) Date of Patent: Sep. 24, 2013

(54) FREQUENCY AGILE DIGITAL RADIO RECEIVER

(75) Inventor: Pierre-Andre Laporte, Gatineau (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/448,763

(22) Filed: Apr. 17, 2012

(51) Int. Cl.
*H04B 1/26* (2006.01)

(52) U.S. Cl.
USPC .............................. 455/131; 455/337; 375/324

(58) Field of Classification Search
USPC .................. 455/131, 337, 307, 266; 375/324, 375/350
See application file for complete search history.

(56) References Cited

U.S. PATENT DOCUMENTS

| | | | |
|---|---|---|---|
| 5,732,337 | A | 3/1998 | Wargnier |
| 5,841,811 | A | 11/1998 | Song |
| 2008/0152050 | A1 | 6/2008 | Watanabe |

OTHER PUBLICATIONS

U.S. Appl. No. 12/970,151, filed Dec. 16, 2010; Inventor: Laporte.

International Search Report and Written opinion mailed Mar. 9, 2012 in corresponding Application No. PCT/IB2011/002879.
Texas Instrument, ADC12D12D1800 datasheet, http://www.national.com/pf/DC/ADC12D1800.html#Overview, Oct. 31, 2011.
C. S. Burrus, "Block Implementation of Digital Filters," IEEE Trans. Circuit Theory, vol. CT-18, Nov. 1971, pp. 697-701.
Ing-Song Lin, et al., "Overlapped Block Digital Filtering", IEEE Transactions on Circuits and Systems-II: Analog and Digital Signal Processing, vol. 43, No. 8, Aug. 1996, pp. 586-596.
Ramin Khoini-Poorfard et al., "Time-Interleaved Oversampling A/D Converters: Theory and Practice", IEEE Transactions on Circuits and Systems-II: Analog and Digital Signal Processing, vol. 44, No. 8, Aug. 1997, pp. 634-645.

*Primary Examiner* — Creighton Smith
(74) *Attorney, Agent, or Firm* — Nixon & Vanderhye P.C.

(57) ABSTRACT

In a digital receiver, an ADC converts an analog RF signal to a digital RF signal at a sample rate of $f_{ADC}$, which is converted into M parallel streams of RF samples. Each stream has a sampling rate of $f_{ADC}/M$, where M is a positive integer greater than 1. After translation into M parallel streams of IF samples centered about an IF of $f_{ADC}/4$, they are demodulated by applying first coefficients to even IF samples to produce even demodulated samples and applying second coefficients to odd IF samples to produce odd demodulated samples. The even samples are filtered using first filter coefficients and the odd samples are filtered using second filter coefficients to produce a complex baseband signal.

28 Claims, 17 Drawing Sheets

FREQUENCY AGILE DIGITAL RADIO RECEIVER

RELATED APPLICATION

This application is related to commonly-assigned U.S. patent application Ser. No. 12/970,151, filed on Dec. 16, 2010, the contents of which are incorporated herein by reference.

TECHNICAL FIELD

The technical field relates to radio communications, and more particularly, to radio receivers that can be configured for operation in different frequency bands.

BACKGROUND

Modern base stations typically have to support multiple standards such as GSM, WCDMA, and LTE. These standards operate in different frequency bands. The frequencies used by each standard also depend on geographical location. Moreover, in order to support the ever-increasing need for bandwidth, operators often use carrier aggregation to provide higher data rates. Unfortunately, re-designing radios for every band of operation is costly for equipment vendors. What is needed is a multi-band radio and/or multi-standard radio that is frequency agile and that avoid analog processing as much as practical.

Recently, the semiconductor industry has started to produce analog-to-digital converters (ADCs) with sampling rates in the GHz range, see for example the Texas Instrument, ADC12D1800 datasheet described at http://www.national.com/pf/DC/ADC12D1800.html#Overview. That means that the analog-to-digital boundary in a radio receiver may be moved closer to the antenna so that most if not all of the receiver signal processing may be done in the digital domain.

But analog-to-digital converters with sampling rates in the GHz range impose severe processing requirements for the digital hardware in such a digital radio receiver (sometimes referred to as a direct-RF receiver). Currently, ASICs and FPGAs typically have operating speeds below 500 MHz. So the implementation of a direct-RF receiver is a challenging task.

SUMMARY

The technology in this application provides a radio receiver with reduced processing requirements as well as hardware cost, complexity, power consumption, and circuit area. The technology also provides a digital radio receiver where frequency translation and demodulation occur in the digital domain.

One aspect of the technology includes a method for use in a radio receiver that comprises the steps of:

receiving an analog radio frequency (RF) signal;

converting the analog RF signal to a digital RF signal at a sample rate of $f_{ADC}$ to generate a serial stream of RF samples;

converting the serial stream of RF samples into M parallel streams of RF samples, each stream having a sampling rate of $f_{ADC}/M$, where M is a positive integer greater than 1;

translating the M parallel streams of RF samples to M parallel streams of intermediate frequency (IF) samples centered about an IF of $f_{ADC}/4$, the M parallel streams of IF samples including a first set of even IF samples and a second set of odd IF samples;

demodulating the M parallel streams of IF samples by applying a first set of associated coefficients to the first set of even IF samples to produce a first set of even demodulated samples and applying a second set of associated coefficients to the second set of odd IF samples to produce a second set of odd demodulated samples; and filtering the even demodulated samples using a first set of filter coefficients of a digital filter and the odd demodulated samples using a second set of filter coefficients of the digital filter to produce a complex baseband signal.

In a preferred example embodiment, the translating and demodulating steps only require M multipliers.

Another aspect of the technology includes an apparatus for use in a radio receiver chain. The radio receiver chain includes an analog-to-digital converter for converting the analog RF signal to a digital RF signal at a sample rate of $f_{ADC}$ to generate a serial stream of RF samples. A serial-to-parallel converter converts the serial stream of RF samples into M parallel streams of RF samples, each stream having a sampling rate of $f_{ADC}/M$, where M is a positive integer greater than 1. Signal processing circuitry translates the M parallel streams of RF samples to M parallel streams of intermediate frequency (IF) samples centered about an IF of $f_{ADC}/4$, the M parallel streams of IF samples including a first set of even IF samples and a second set of odd IF samples. The signal processing circuitry also demodulates the M parallel streams of IF samples by applying a first set of associated coefficients to the first set of even IF samples to produce a first set of even demodulated samples and applying a second set of associated coefficients to the second set of odd IF samples to produce a second set of odd demodulated samples. A filter filters the even demodulated samples using a first set of filter coefficients of a digital filter and the odd demodulated samples using a second set of filter coefficients of the digital filter to produce a complex baseband signal.

In an example embodiment, the associated coefficients are based on the IF of $f_{ADC}/4$, the associated coefficients include 1 and −1 or 2 and −2, and/or M is an even number.

The filter in one example implementation is an N-tap finite impulse response (FIR) filter, where N is a positive integer, that uses block digital filtering with two parallel filtering paths with one of the filtering paths operable at 1/M of the sampling frequency on the first set of even baseband samples using even phases of the N-tap FIR filter and the other of the filtering paths operable at 1/M of the sampling frequency on the second set of odd baseband samples using odd phases of the N-tap FIR filter.

Advantageously, in a preferred example implementation, the signal processing circuitry only requires N multipliers and N−2 adders, the translating and demodulating steps only require M multipliers.

In an example embodiment, the filter decimates the complex baseband signal by filtering only a subset of the even and odd demodulated samples. Each subset corresponds to a number of samples required for a desired decimation.

A further aspect of the technology includes a frequency-agile radio receiver system. An analog input receives an analog radio frequency (RF) signal, and an analog-to-digital converter for converting the analog RF signal to a digital RF signal at a sample rate of $f_{ADC}$ to generate a serial stream of RF samples. A serial-to-parallel converter converts the serial stream of RF samples into M parallel streams of RF samples, each stream having a sampling rate of $f_{ADC}/M$, where M is a positive integer greater than 1. Signal processing circuitry translates the M parallel streams of RF samples to M parallel streams of intermediate frequency (IF) samples centered about an IF of $f_{ADC}/4$. The M parallel streams of IF samples include a first set of even IF samples and a second set of odd IF samples. The signal processing circuitry demodulates the M parallel streams of IF samples by applying a first set of associated coefficients to the first set of even IF samples to produce a first set of even demodulated samples and applying a second set of associated coefficients to the second set of odd IF samples to produce a second set of odd demodulated samples. A filter filters the even demodulated samples using a first set of filter coefficients of a digital filter and the odd demodulated samples using a second set of filter coefficients of the digital filter to produce a complex baseband signal. In an example implementation, the first and second sets of filter coefficients are based on a desired signal bandwidth for the radio receiver to receive RF signals.

The frequency-agile radio receiver may also include an antenna coupled to provide the analog RF signal to the analog input.

In one example embodiment, the frequency-agile radio receiver system is selectively operable in different Nyquist zones of operations. Swapping circuitry is configured to swapping the even baseband samples with the odd baseband samples if a selected one of the Nyquist zones is an even Nyquist zone. Multiple selectable filters are provided, each corresponding to a different Nyquist zone of operation for filtering the analog RF signal. A switch is configured to receive outputs from each of the selectable filters, and a controller is configured to control the switch to provide one of the filter outputs to the analog-to-digital converter. The signal processing circuitry may also be configured to calculate an aliased version of an RF carrier located in a selected one of the Nyquist zones and to calculate a tuning frequency for aliased version of an RF carrier which can be used to translate the aliased version of an RF carrier to $f_{ADC}/4$.

DETAILED DESCRIPTION OF EXAMPLE EMBODIMENTS

Figure 1:
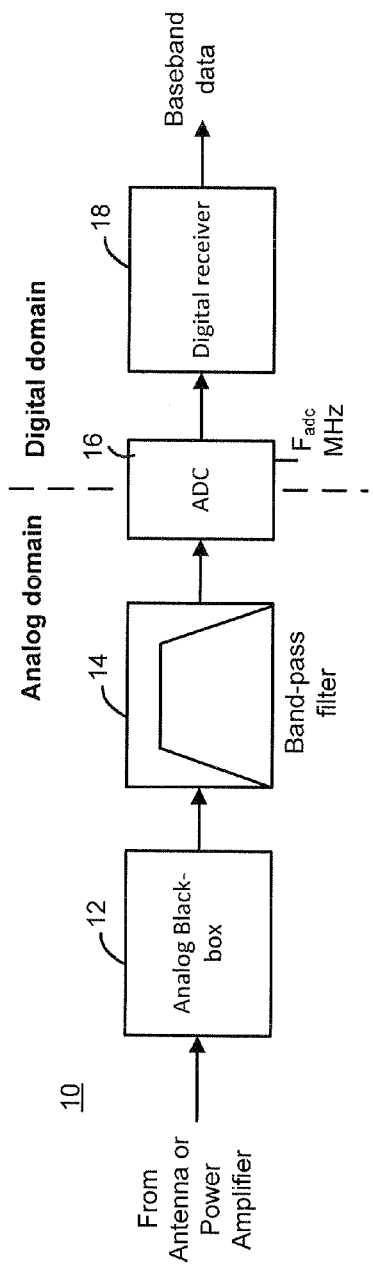
FIG. 1 illustrates a non-limiting example of a radio receiver system.

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions.

Thus, for example, it will be appreciated by those skilled in the art that diagrams herein can represent conceptual views of illustrative circuitry or other functional units. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

FIG. 1 illustrates a non-limiting example of a frequency-agile radio receiver system 10. The radio frequency (RF) input may come either from an antenna or from the output of a power amplifier (PA) depending on whether the processing chain is used in a communication receiver or in a feedback receiver for PA linearization. In the case where the processing chain is used in a communication receiver, the analog blackbox 12 would contain a low-noise amplifier; otherwise, it would contain an attenuator. The analog-to-digital converter (ADC) 16 samples the signal at a frequency $F_{ADC}$, which in one non-limiting example can be in the GHz range. The technology in this application is not limited to a particular $F_{ADC}$. The digital samples from the ADC 16 are provided in a digital receiver 18 which produces a baseband output corresponding to the input RF signal. The band-pass filter 14 preceding the ADC 16 is preferably wide. In one preferred example, this filter 14 covers one entire Nyquist zone in order to provide as much frequency agility as possible. The Nyquist bandwidth is defined to be the frequency spectrum from dc to $F_{ADC}/2$, and the frequency spectrum can be divided into an infinite number of Nyquist zones, each having a width equal to $F_{ADC}/2$. In the case where the system is intended to work in the first Nyquist zone, the filter 14 is a low-pass filter that covers the frequency interval $[0=F_{ADC}/2]$. As described later, the ADC analog bandwidth can cover multiple Nyquist zones.

To support what can be very demanding data rates in the digital domain, parallel data processing hardware may be used that operates at a lower speed that can be achieved in with current ASIC and FPGA technologies. In other words, M times the hardware running at 1/M the ADC sample rate can be used. However, a drawback with this approach is that the amount of digital hardware needed to implement digital signal processing (DSP) functions grows very quickly as the sample rate $F_{ADC}$ increases. Ultimately, this leads to large power dissipation and requires a large silicon area. Both are disadvantageous.

Figure 2:
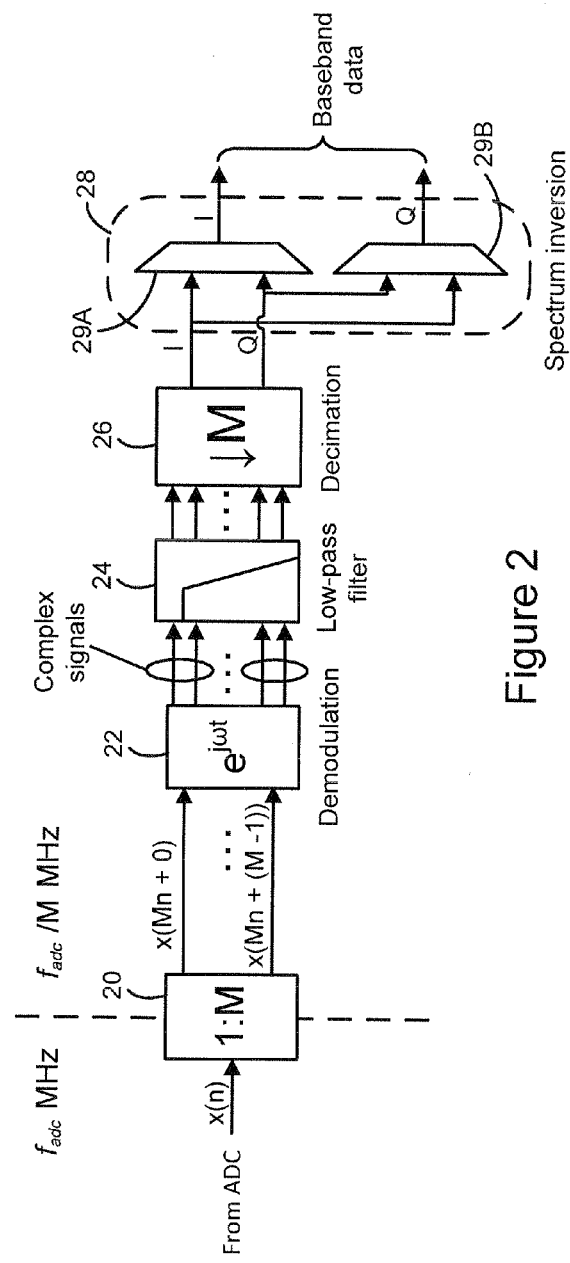
FIG. 2 illustrates a non-limiting example of a digital receiver.

FIG. 2 shows a high level diagram of an example digital receiver 18. A serial-to-parallel converter 20 labeled as 1:M reduces the necessary processing speed by a coefficient of M by creating M parallel output streams. The first stream is provided with a first sample x(Mn+0), the second stream is provided with the next serial sample x(Mn+1), and so forth on to the Mth stream which is provided serial sample x(Mn+(M−1)), where "n" is the sample index. The next serial sample x(Mn+M) is provided to the first stream and so forth. The demodulator 22 translates the RF signal to baseband using M parallel demodulation branches. A low-pass filter 24 removes images introduced by demodulation process, and a decimator 26 reduces the sample rate to the baseband rate by dividing by M. In other words, the decimation coefficient corresponds to M.

Figure 3A:
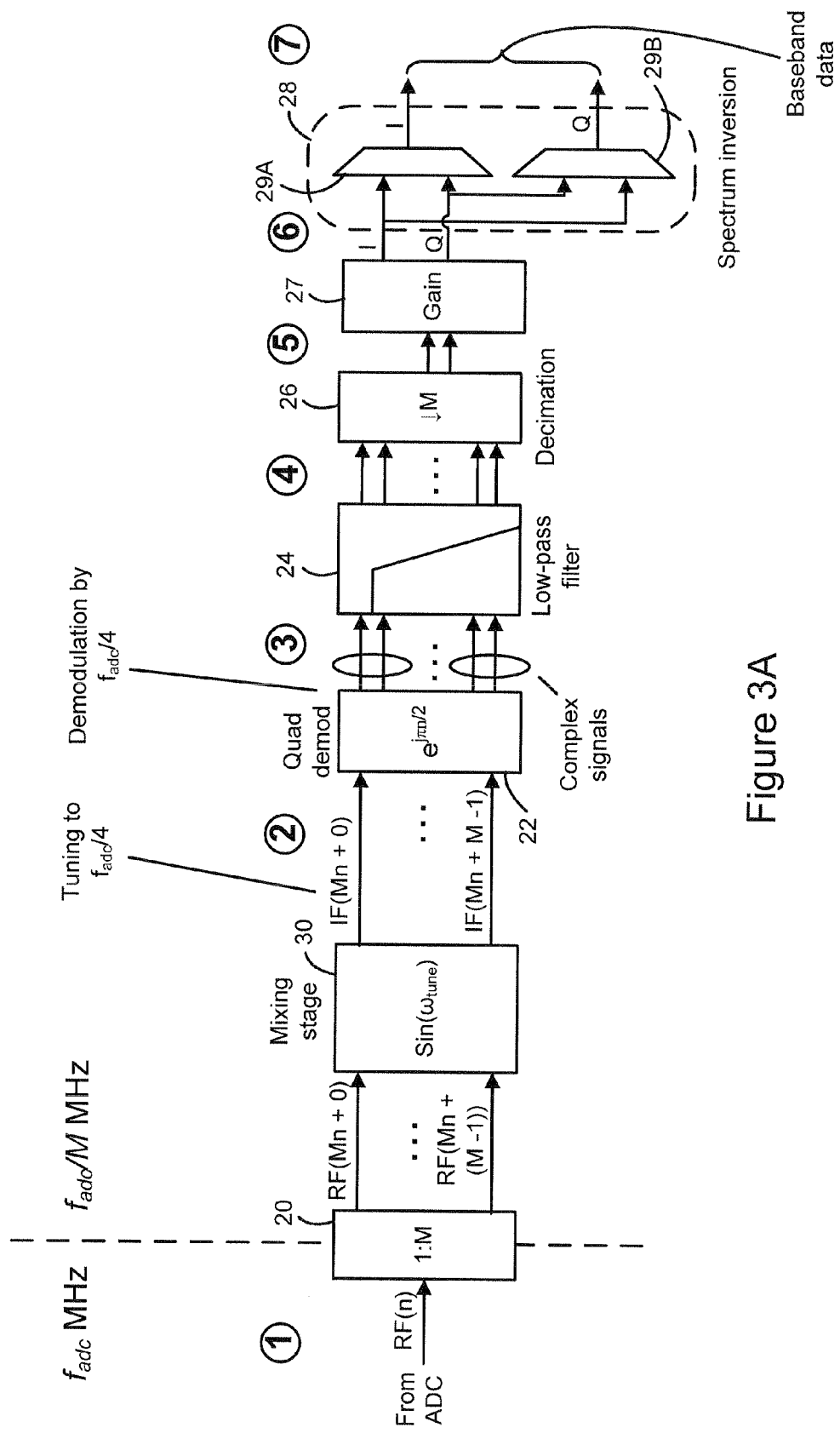
FIG. 3A illustrates further details of a non-limiting example of a digital receiver.

The processing structure and/or requirements of the digital receiver 18 may be simplified as now described in conjunction with FIG. 3A which shows a non-limiting example of a digital receiver. A mixing stage or tuner 30 performs frequency translation to center the input RF digital signal represented using M parallel RF streams at an intermediate frequency (IF) that corresponds to $f_{adc}/4$. The quadrature demodulator 22 demodulates the IF signal represented by M parallel IF streams that have a sample rate of $f_{adc}/M$.

An advantage of selecting the intermediate frequency (IF) to correspond to $f_{adc}/4$ is that sine and cosine waves used for quadrature demodulation of the ADC 16 output can be represented digitally using only 1, 0, and −1, as shown in the following equations:

$$\cos(2\pi f_{IF} t) = \cos\left(2\pi \frac{f_{adc}}{4} t\right) = \cos\left(2\pi \frac{f_{adc}}{4}(nT_s)\right) =$$
$$\cos\left(\frac{2\pi}{4} \frac{1}{T_s}(nT_s)\right) = \cos\left(\frac{\pi}{2} \times n\right) = \{1, 0, -1, 0, 1, \dots\}$$

$$\sin(2\pi f_{IF} t) = \sin\left(2\pi \frac{f_{adc}}{4} t\right) = \sin\left(2\pi \frac{f_{adc}}{4}(nT_s)\right) =$$
$$\sin\left(\frac{2\pi}{4} \frac{1}{T_s}(nT_s)\right) = \sin\left(\frac{\pi}{2} \times n\right) = \{0, 1, 0, -1, 0, \dots\}$$

where:
$f_{adc}$ is the analog-to-digital converter sampling frequency,
$f_{IF}$ is the intermediate frequency ($f_{IF} = f_{adc}/4$),
$T_S$ is the analog-to-digital converter sampling period ($T_S = 1/f_{adc}$),
t is the time in the analog domain, and
n is the sample index of the sine and cosine waves in the digital domain.

A decimate-by-M function 26 follows the digital low-pass filter 24 in order to reduce the sample rate so that the signal spectrum is properly represented using the smallest appropriate sample rate. Gain 27 and spectrum inversion 28 (if necessary) stages preferably follow and are described further below. Ultimately, the output of the digital receiver 18 includes I and Q baseband data.

Figure 3B:
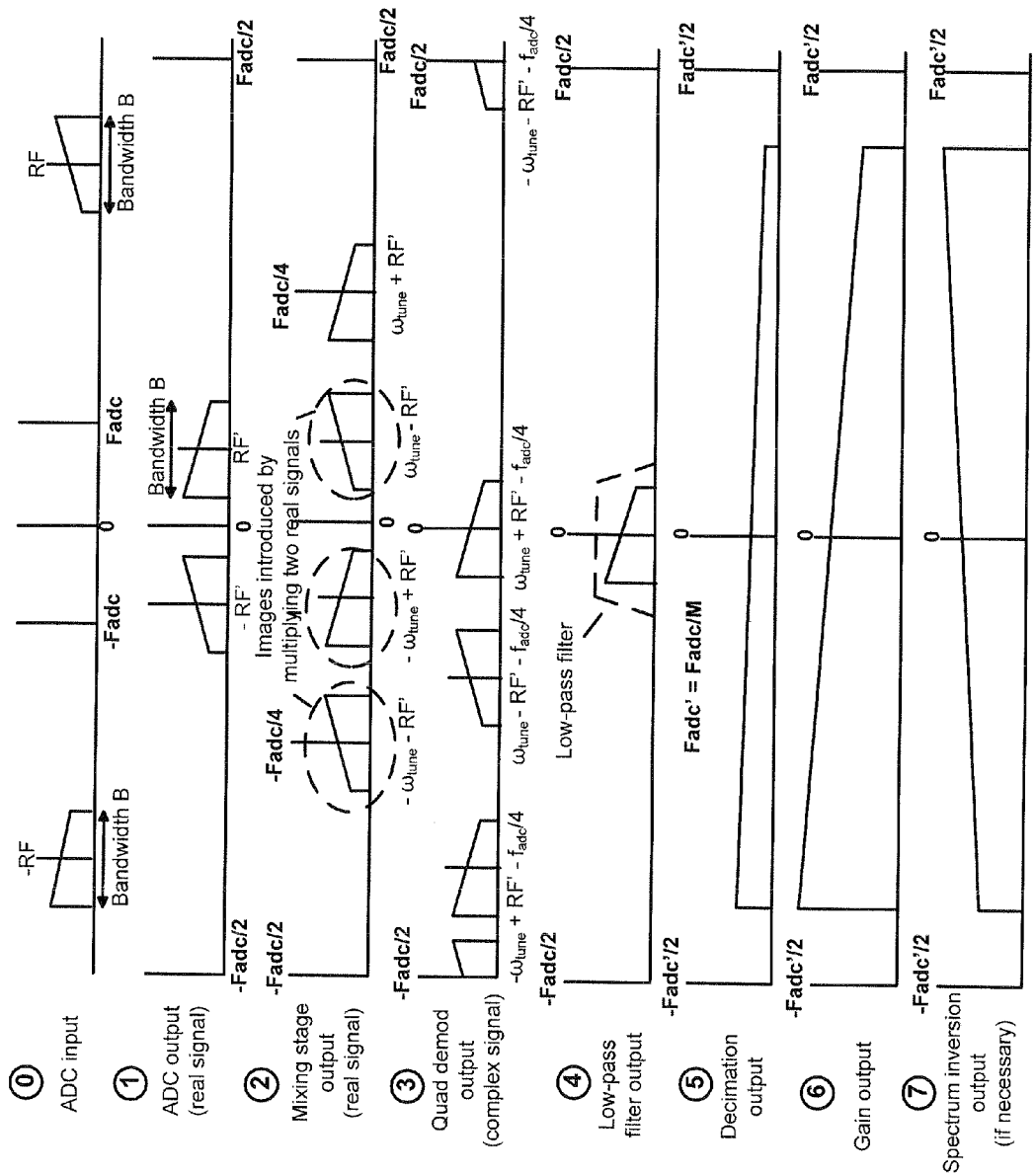
FIG. 3B illustrates the spectrum of a signal at various points in the digital receiver shown in FIG. 3A.

FIG. 3B illustrates the spectrum of a signal at various points in the example digital receiver shown in FIG. 3A.

Figure 4:
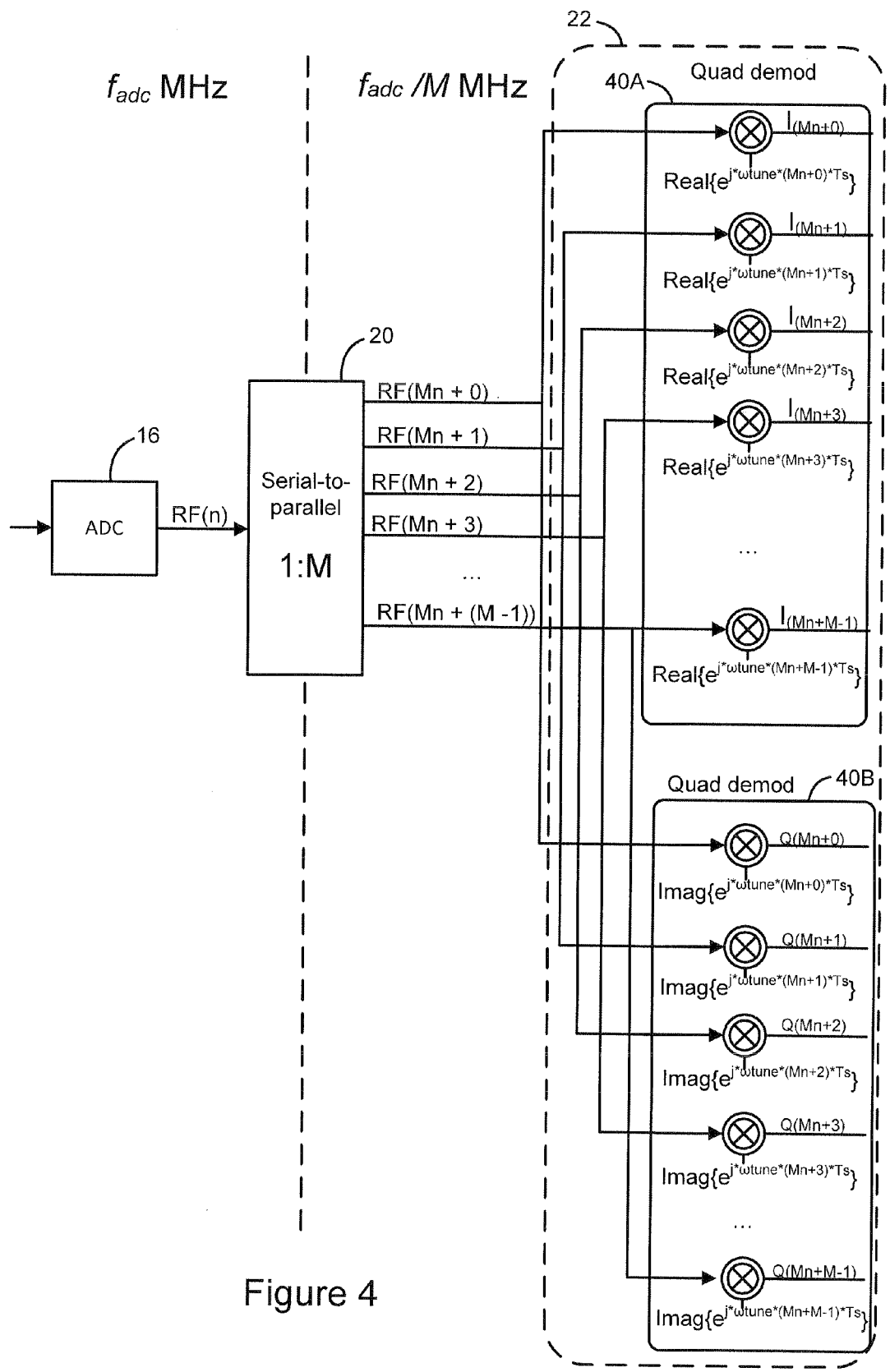
FIG. 4 shows a conventional approach to a quadrature demodulation scheme that uses M parallel branches operating at $f_{adc}/M$.

FIG. 4 shows what might be a conventional approach to a quadrature demodulation scheme for the M streams, which requires 2×M multipliers, where M is a positive integer greater than one corresponding to the number of parallel branches. Each sample in each of the M parallel streams is multiplied by a local oscillator frequency used to translate the RF samples to complex baseband samples having real and imaginary components. Two quadrature demodulators 40A and 40B are shown: quadrature demodulator 40A generates the real component baseband sample streams using a corresponding cosine wave for each of the M streams and quadrature demodulator 40B generates the imaginary component baseband sample streams using a corresponding sine wave for each of the M streams.

One of the advantageous features of the technology described in this application is that the demodulator 22 multiplies each incoming sample stream with a sine and a cosine wave at a frequency of $f_{adc}/4$, which allows the complexity of the demodulator to be dramatically reduced. From a time domain perspective, in order to generate the real sample values (the I's) for each input sample stream, each incoming stream is multiplied by the cosine sequence {1 0 −1 0 1 0 −1 0 etc.} from the cosine equation given above, which also corresponds to $$\cos\left(\frac{\pi \times n}{2}\right).$$

A key realization made by the inventor is that the odd samples in the real demodulated stream for I are all zeros. Similarly, in order to generate the imaginary sample values (the Q's), each incoming sample stream is multiplied by the sequence {0 1 0 −1 0 1 0 −1 etc} from the sine equation given above, which corresponds to $$\sin\left(\frac{\pi \times n}{2}\right).$$

The inventor further realized that all the even samples in the demodulated stream for Q are zeros. These two realizations allow dramatic simplification of hardware as now explained.

Figure 5:
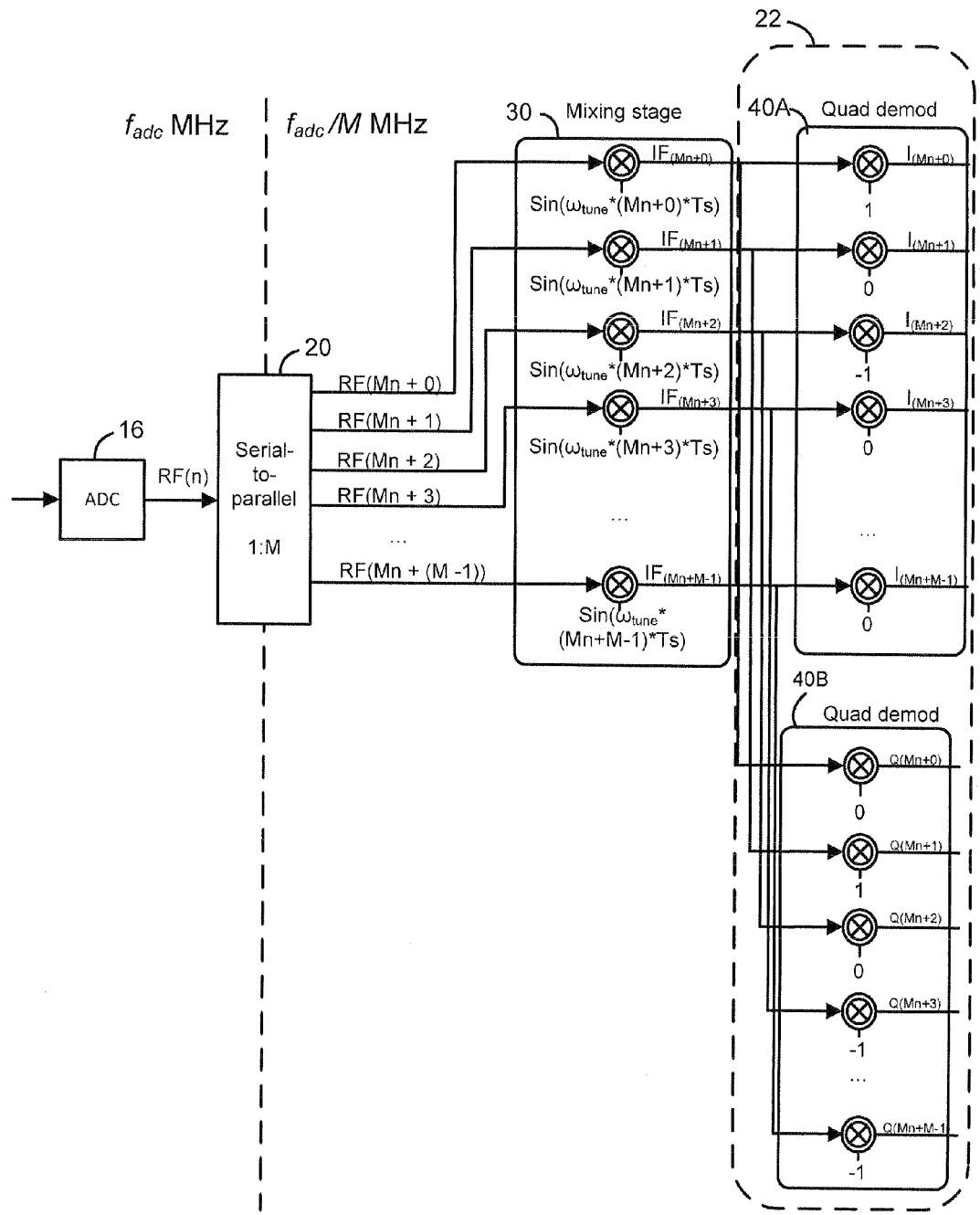
FIG. 5 is a diagram that shows a mixing stage and a quadrature demodulation stage using M parallel branches operating at $f_{adc}/M$ and using $f_{IF}=f_{adc}/4$.

When hardware duplication is used to achieve a given sample rate, the quadrature demodulation process can be implemented using a duplicate quadrature demodulator similar to that presented in FIG. 4. But a better approach is to use the advantages associated with multiplying each incoming sample stream with a tuning signal at a frequency of $f_{adc}/4$. In this regard, FIG. 5 shows an example mixing stage 30 and quadrature demodulation stage 22 using $f_{IF}=f_{adc}/4$ demodulation scheme that substantially reduces the number of multipliers and complexity of operation for demodulation to baseband. The mixing stage 30 (not used in FIG. 4) uses M multipliers that perform mixing using a corresponding sine wave for each of the M streams to frequency translate the RF samples down to IF samples with $f_{IF}=f_{adc}/4$ in order to obtain the advantages identified above, i.e., the sine and cosine waves used for quadrature demodulation of the ADC IF output can be represented digitally using only 1, 0, and −1. Each of the M sample streams is divided into even and odd sample streams and provided to a corresponding quadrature demodulator. The first quadrature demodulator 40A contains even multipliers for multiplying the even streams by the alternating sequence 1 −1 1 −1 and odd multipliers for multiplying the odd streams by a sequence of 0's because of the special properties of using $f_{IF}=f_{adc}/4$. A second quadrature demodulator 40B includes even multipliers for multiplying each even stream by a sequence of 0's and odd multipliers for multiplying each odd stream by the alternating sequence 1 −1 1 −1, again because of the special properties of using $f_{IF}=f_{adc}/4$. Actual hardware multipliers are not required to perform these operations. Instead, the $I_{even}$ stream may be generated by negating one of every two samples of the even samples stream, and the $I_{odd}$ stream may be generated by zeroing the odd samples stream. Similarly, the $Q_{even}$ stream may be generated by zeroing the even samples stream, and the $Q_{odd}$ stream may be generated by negating one of every two samples of the odd samples stream.

Figure 6:
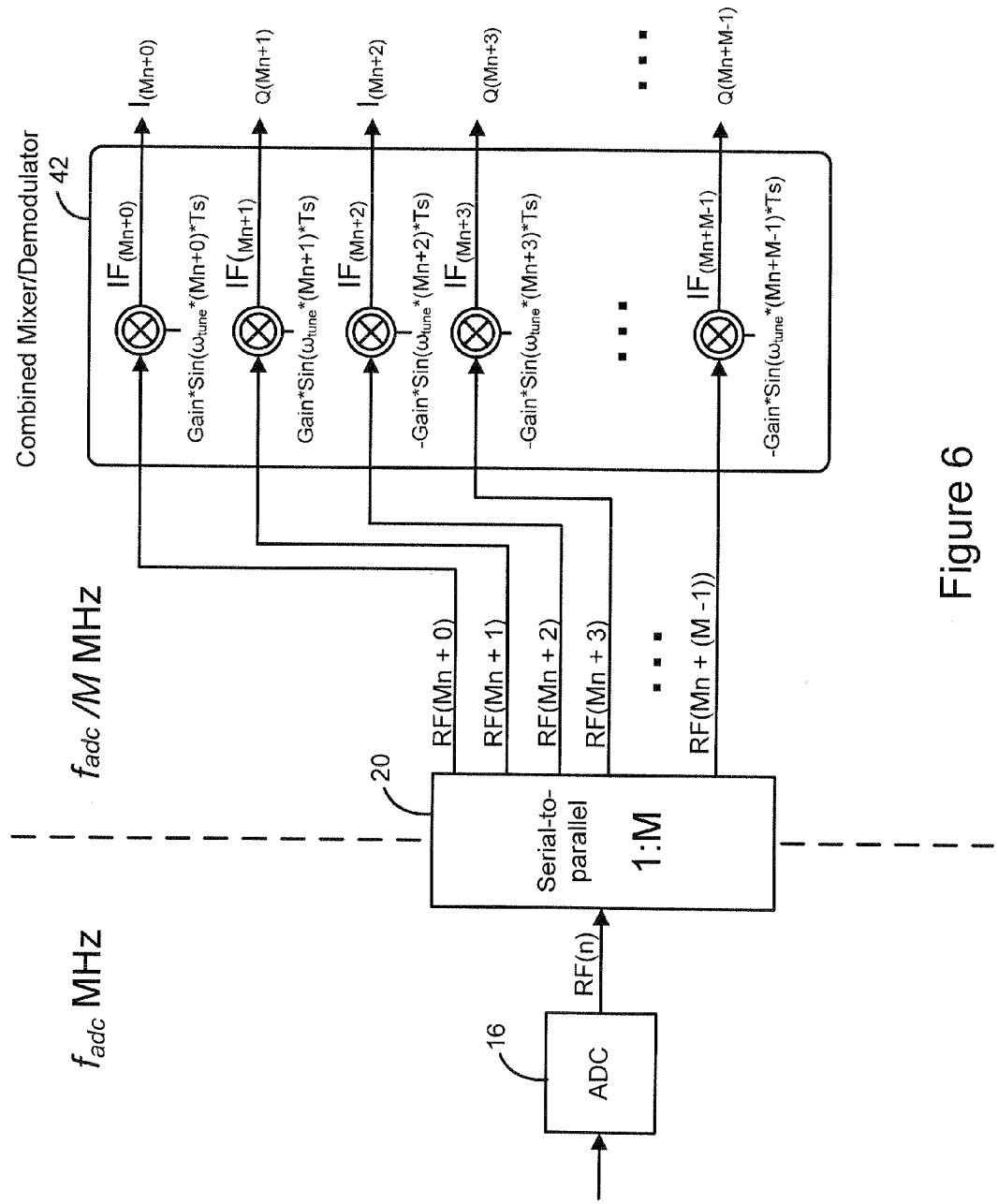
FIG. 6 is a diagram that shows a combined mixer/demodulator using parallel branches operating at $f_{adc}/M$ an using $f_{IF}=f_{adc}/4$.

FIG. 6 shows the further optimized demodulation scheme where all the branches multiplied by zero are removed, and the multiplications by coefficients 1 and −1 are moved to the mixing stage by effectively changing the sign of the coefficient when required. The combined mixer/demodulator 42 in FIG. 6 only uses M multipliers as compared to 2×M multipliers used in the demodulation scheme shown in FIG. 4. The combined mixer/demodulator 42 frequency translates the M RF sample streams into M baseband (BB) sample streams with real (I) and imaginary (Q) components. The multiplication of two real signals in the mixing stage reduces the signal amplitude by a factor of two. However, this can be compensated for in the digital hardware by changing the coefficient value of 1 or −1 in each demodulating signal sin $(\omega_{tune}*(Mn+0)*Ts), \ldots, \sin(\omega_{tune}*(Mn+M-1)*Ts)$ to a suitably scaled coefficient value labeled as "Gain" in FIG. 6. $Ts=1/f_{adc}$. Preferred but example scaling coefficient values to scale the baseband signal in this situation include 2 and −2.

Next, the digital filtering stage 24 is addressed. A Finite Impulse Response (FIR) filter can be implemented using M times the hardware at a 1/M rate using a technique called block digital filtering. Two references explain this technique and provide non-limiting examples of filter implementations: (1) Ing-Song Lin, Sanjit K. Mitra, "Overlapped Block Digital Filtering," IEEE Transactions on Circuits and Systems—II: Analog and Digital Signal Processing, Vol. 43, No. 8, August 1996, pp. 586-596 and (2) Ramin Khoini-Poorfard; Lysander B. Lim; David A. Johns, "Time-Interleaved Oversampling A/D Converters: Theory and Practice," IEEE Transactions on Circuits and Systems—II: Analog and Digital Signal Processing, Vol. 44, No. 8, August 1997, pp. 634-645. These references are incorporated here by reference.

A FIR filter implements the convolution described by the following equation:

$$y(m) = \sum_{n=0}^{N-1} h(n)x(m-n), m \in [0 : L_x - 1],$$

where:
y is the filter output stream,
x is the filter input stream,
m is the sample index for both the input and output streams,
h is the filter impulse response, i.e., the filter coefficients,
n is the filter tap index,
N is the total number of taps in the FIR,
$L_x$ is the length of the input stream in samples.

For the case where the filter is implemented using M branches, the convolution performed by the FIR filter can be re-written as follows using variable substitutions, where the first equation represents the calculations for the first branch, and the second equation represents the calculations for the $(M-1)^{th}$ branch.

$$y_0(k) = y(Mk - 0) = \sum_{n=0}^{N-1} h(n)x(Mk - 0 - n), k \in \left[0 : \frac{L_x}{M} - 1\right],$$

$$y_{M-1}(k) = y(Mk - (M-1)) = \sum_{n=0}^{N-1} h(n)x(Mk - (M-1) - n),$$

$$k \in \left[0 : \frac{L_x}{M} - 1\right].$$

The above convolutions can be further expanded by introducing M phases inside the filter, i.e., M summations for different coefficient subsets represented by $(h(Mn_0+0))$ and $(h(Mn_{M-1}+M-1))$ in the equations below:

$$y_0(k) = y(Mk - (0)) = \sum_{n_0=0}^{N_0-1} h(Mn_0 + 0)x(Mk - (0) - (Mn_0 + 0)) +$$

$$\ldots + \sum_{n_{M-1}=0}^{N_{M-1}-1} h(Mn_{M-1} + (M-1))$$

$$x(Mk - (0) - (Mn_{M-1} + (M-1))),$$

$$y_{M-1}(k) = y(Mk - (M-1)) =$$

$$\sum_{n_0=0}^{N_0-1} h(Mn_0 + 0)x(Mk - (M-1) - (Mn_0 + 0)) +$$

$$\ldots + \sum_{n_{M-1}=0}^{N_{M-1}-1} h(Mn_{M-1} + (M-1))$$

$$x(Mk - (M-1) - (Mn_{M-1} + (M-1)))$$

The above equations can be re-written as follows:

$$y_0(k) = \sum_{n_0=0}^{N_0-1} h(Mn_0)x(M(k-n_0)) + \ldots +$$

$$\sum_{n_{M-1}=0}^{N_{M-1}-1} h(Mn_{M-1} + (M-1))x(M(k-n_{M-1}) - (M-1)),$$

$$y_{M-1}(k) = \sum_{n_0=0}^{N_0-1} h(Mn_0)x(M(k-n_0) - (M-1)) + \ldots +$$

$$\sum_{n_{M-1}=0}^{N_{M-1}-1} h(Mn_{M-1} + (M-1))x(M(k-n_{M-1}-2)+2)$$

On initial startup, when k=0, the above equations require a value for x(−1) to x(−(M−1)) that do not exist. In order to satisfy this requirement, all the sample streams except the first one are delayed by an extra clock cycle at the input of the filter so that x(−1) to x(−(M−1)) are equal to zero. Similarly, the first output samples from y(−(M−1)) to y(−1) will always correspond to zero.

Figure 7:
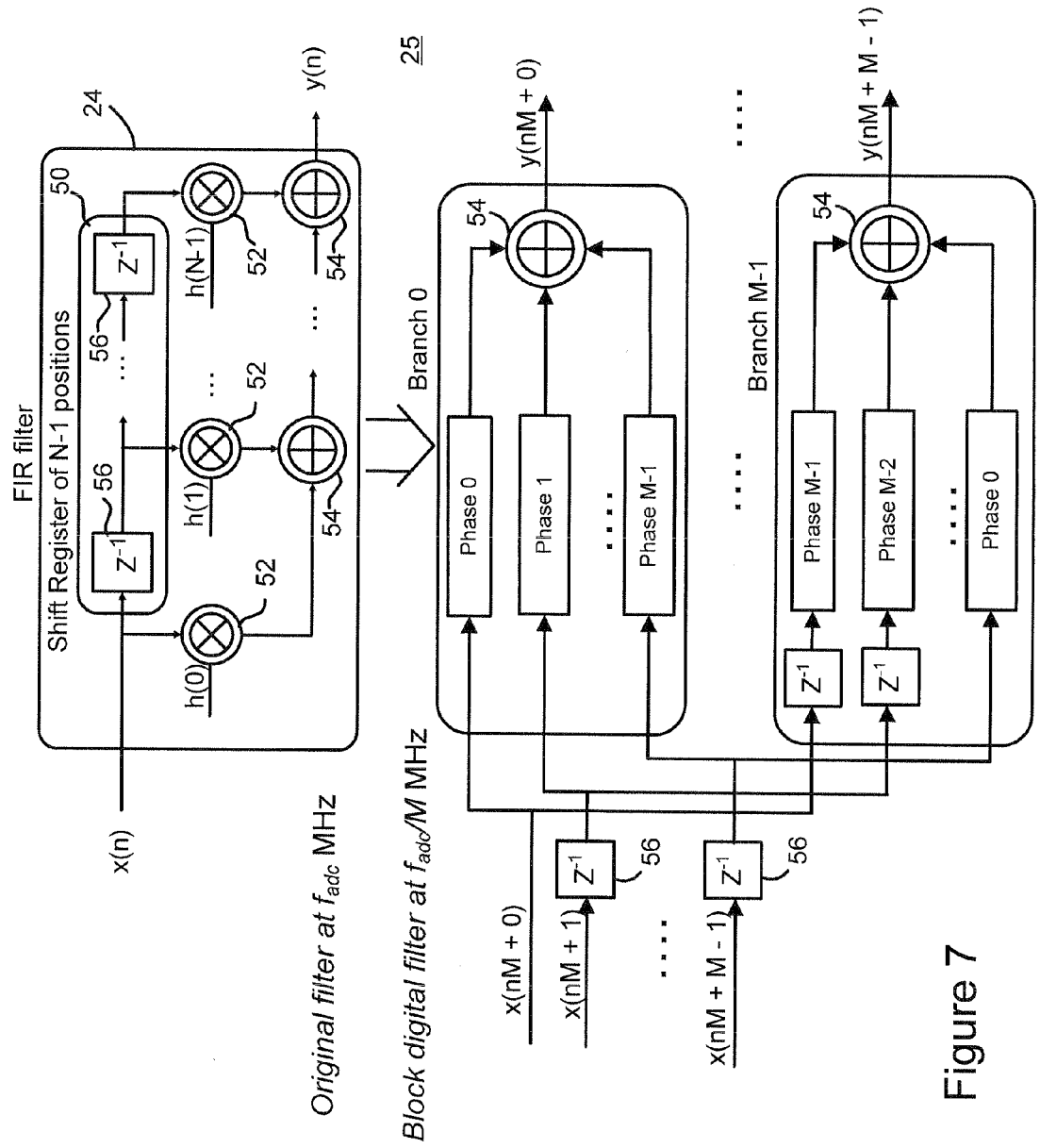
FIG. 7 illustrates a non-limiting example of a digital FIR filter implemented as a block digital filter using M parallel branches operating at $f_{adc}/M$.

FIG. 7 illustrates a non-limiting example of a digital FIR filter implemented as a block digital filter implementation using M branches and a sample rate of $f_{adc}/M$. The FIR filter 24 includes a shift register 50 that effectively introduces a series of delays ($Z^{-1}$) 56 for the input data sample as the sample is clocked through the register. The FIR filter is an N-tap filter, where N is a positive integer, so the shifter register includes N−1 delays 56. The input sample and each delayed output sample are sent to a corresponding multiplier 52 and multiplied by a corresponding filter coefficient, tap, or weight h(n), where n is an integer that corresponds to the register index, and n is in the range of [0: N−1]. The outputs of all of N multipliers 52 are summed in summers 54 to generate a filtered output.

Based on the block filtering technique described above, the FIR filter 24 may be implemented as a polyphase or block filter 25 with M phases (0, 1, . . . , M−1). Each phase corresponds to a filter coefficient subset. In the situation where the original FIR filter 24 has N filter coefficients, the different filter phases may be implemented as smaller FIR filters with N/M coefficients. All the input streams except the first one are delayed by a delay element 56. Respective summers 54 sum the outputs from the various phases to generate the outputs for the different filter branches.

At the outputs of the block digital filter 25 of FIG. 7, the aggregated sample rate corresponds to M-$f_{ADC}$/M samples per second. As illustrated in FIG. 2, the low-pass filter 24 is followed by a decimation-by-M function 26. The role of the decimation-by-M function block 26 is to bring the aggregated sample rate to $f_{ADC}$/M samples per second. In other words, the decimation-by-M function block 26 shown in FIG. 2 selects one of every M samples and discards the other samples. An alternative to this approach that eliminates the need for the decimator 26 is to remove M−1 branches inside the block digital filter 25 of FIG. 7, so that the filter output sample rate is already at $f_{ADC}$/M samples per second. The result is that only one of the M FIR filter branches is needed. So in addition to eliminating the decimator block 26, this alternative approach provides the further benefit of reducing the filter complexity by M.

Figure 8:
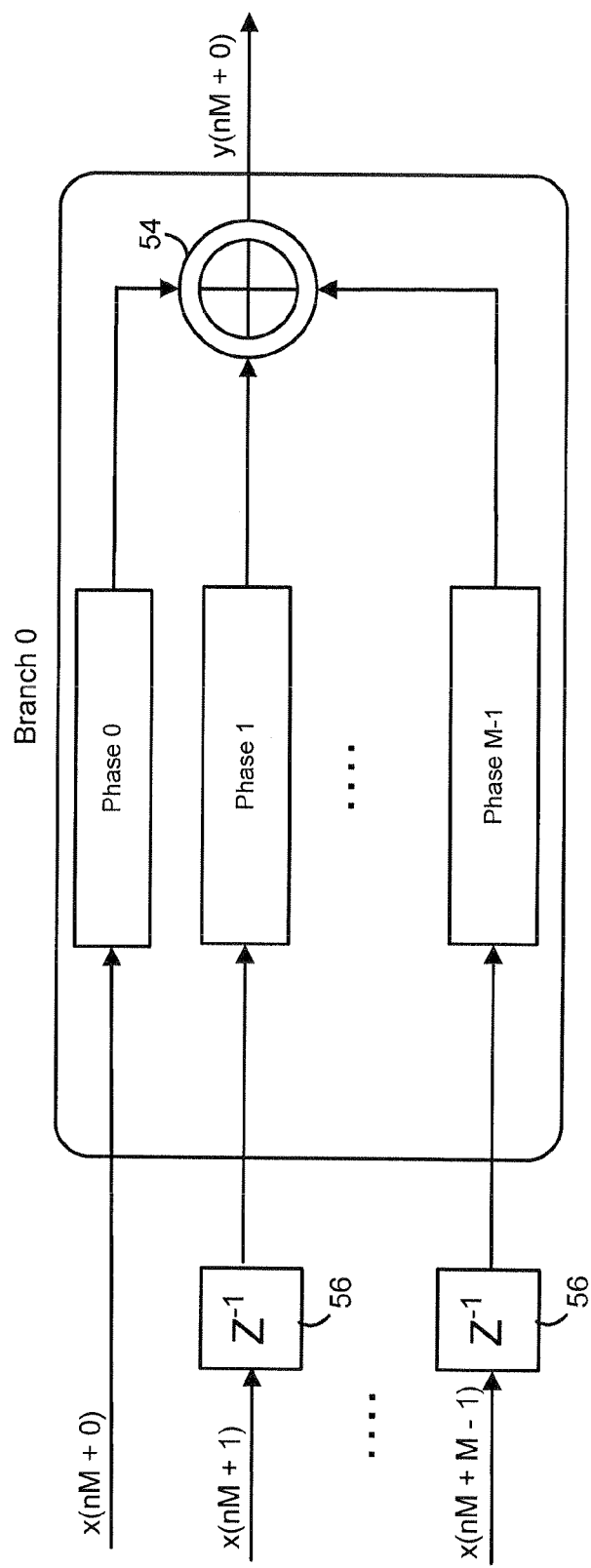
FIG. 8 is an example of branch 0 for the example block digital filter in FIG. 7.
Figure 9:
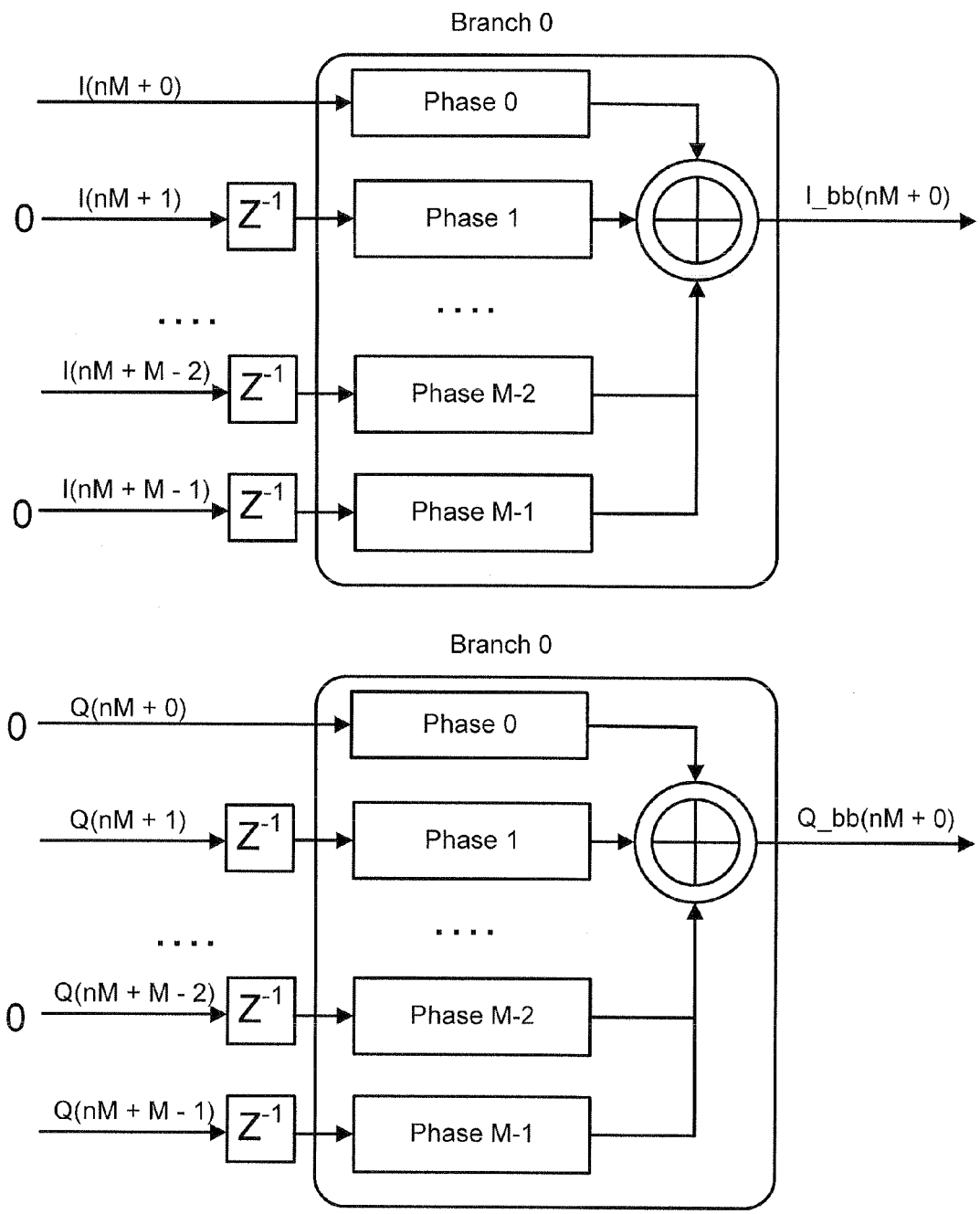
FIG. 9 is an example of a real section 0 and an imaginary section 0 for the example block digital filter in FIG. 7 based on branch 0 in FIG. 8 that may be realized by using $f_{IF}=f_{adc}/4$ in the demodulation stage.

FIG. 8 shows the optimization from combining the block digital filter with the decimation block resulting in a single branch, Branch 0 is shown as an example branch, for the example block digital filter in FIG. 7. The output of Branch 0, y(nM+0), is at the baseband rate. Although only one branch, in this example Branch 0, is required to implement the filter/decimator, filtering is required for both the I streams and the Q streams. FIG. 9 shows an example filter hardware implementation receiving input from the demodulator 22. The odd samples for the I stream are all zeros (phases 1, 3, etc.) because of the demodulation using $f_{adc}/4$. Similarly, the even samples for the Q stream are also all zeros (phases 0, 2, etc.). Therefore, these zero branches can be removed.

Figure 10:
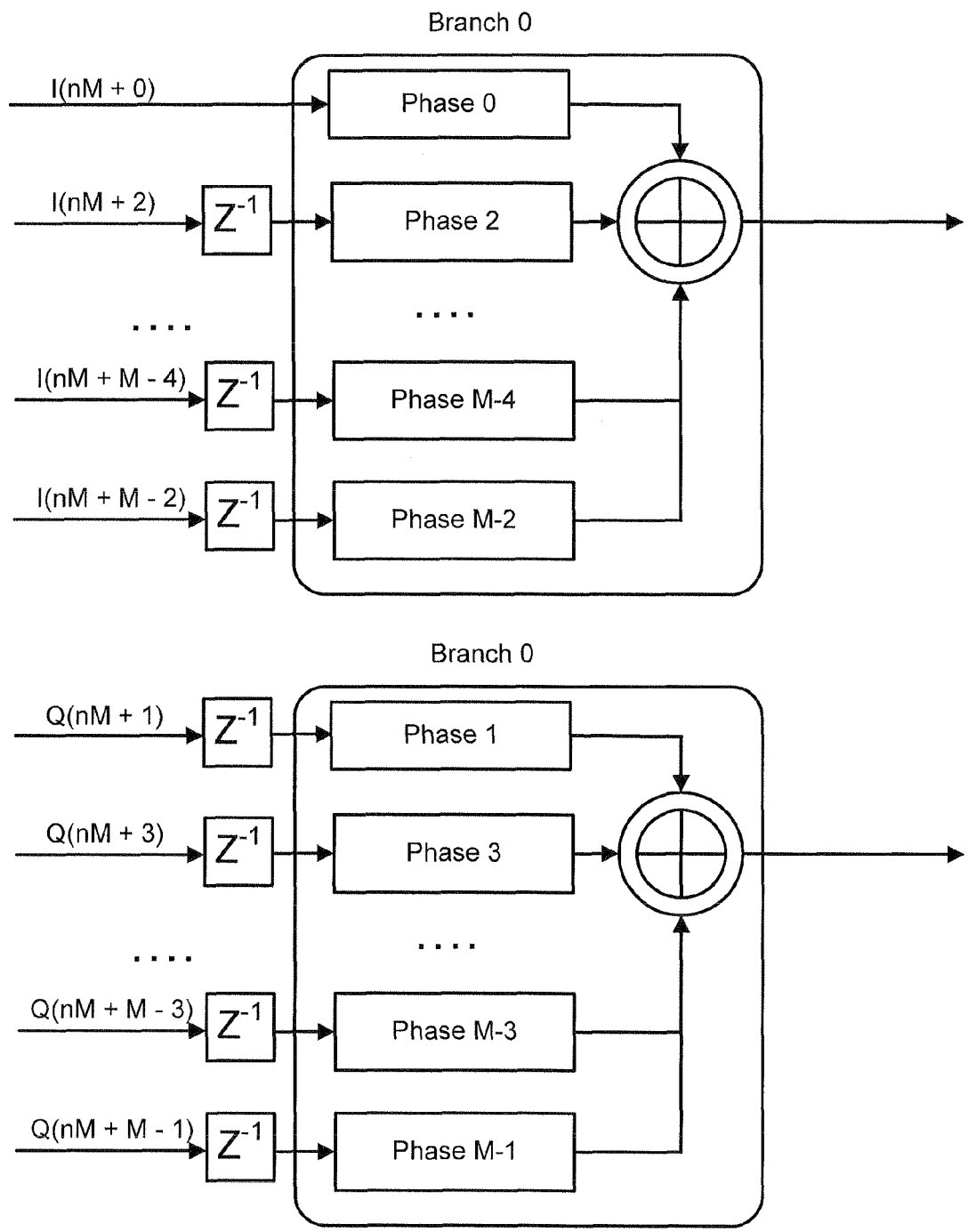
FIG. 10 is a simplified version of the real and imaginary sections 0 shown in FIG. 9 that may be realized by using $f_{IF}=f_{adc}/4$ in the demodulation stage.

FIG. 10 shows an example filter architecture with the zero branches removed and with the I section 0 including the even phases 0, 2, . . . , M−2, and the Q section 0 including the odd phases 1, 3, . . . , M−1. This third optimization reduces the overall filter complexity by a factor of 2. The filter provides baseband I and Q outputs I_bb(nM+0) and Q_bb(nM+0).

Figure 11:
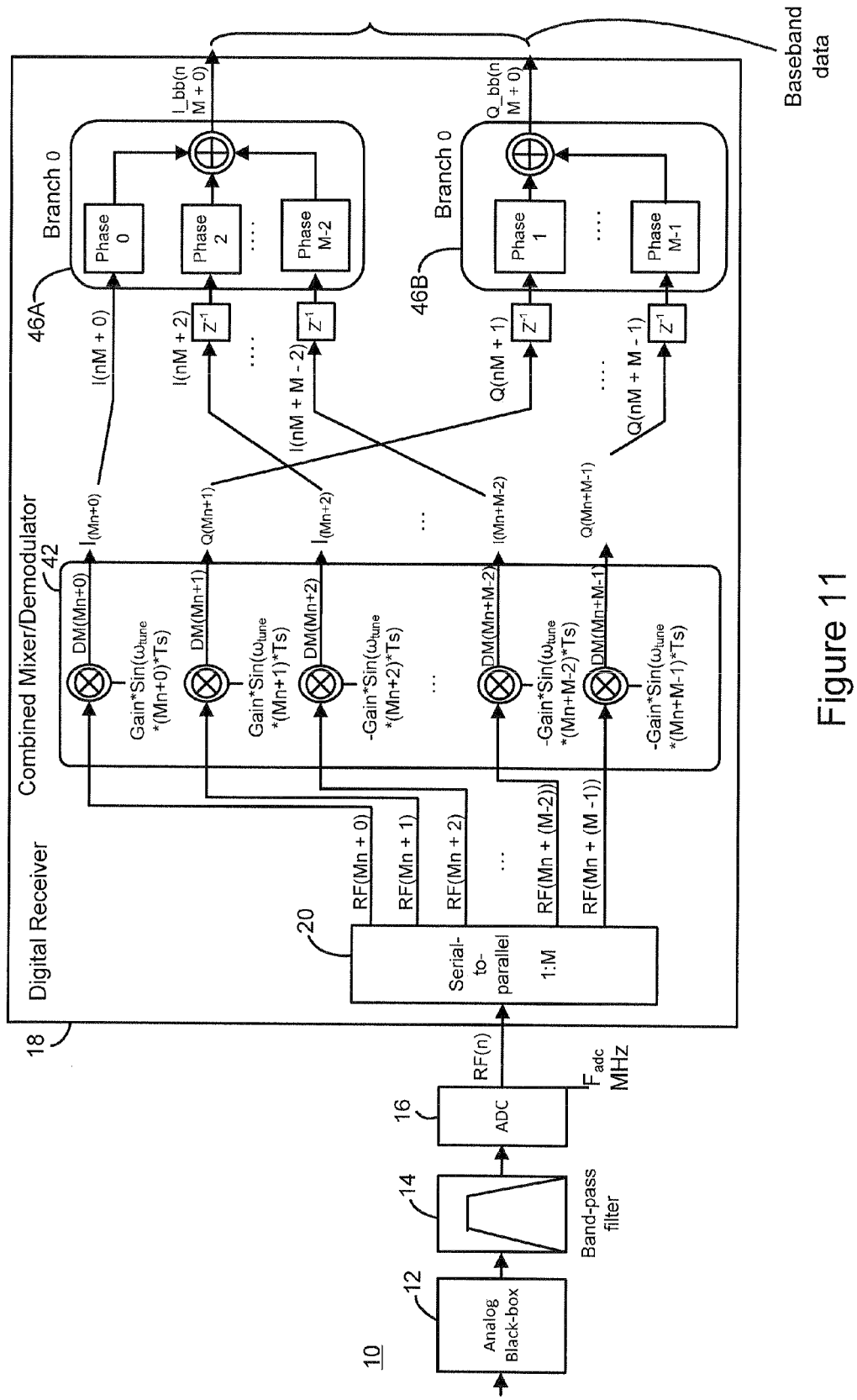
FIG. 11 is a non-limiting, example implementation of a frequency-agile radio receiver system.

FIG. 11 is a non-limiting, example implementation of a frequency-agile radio receiver system 10 that incorporates optimizations described above. The digital RF signal RF(n) from the ADC 16 is converted to M parallel streams in the serial to parallel converter 20 as before: RF(Mn+0), RF(Mn+1), . . . , RF(Mn+M−1). These M streams are frequency translated and demodulated in a combined mixer/demodulator 42 using corresponding tuning signals and coefficients based on using $f_{IF}=f_{adc}/4$. The coefficient is labelled gain in the figure. The resulting demodulated signals include real components I(nM+0), I(nM+2), . . . , I(nM+M−2), and imaginary components Q(nM+1), Q(nM+3), . . . , Q(nM+M−1). The real components are fed to a first filter 46A corresponding to branch 0 of the block filter described above, and the imaginary components are fed to a second filter 46B corresponding to branch 0 of the block filter described above. The two outputs from the filters 46A and 46B, I_bb(nM+0) and Q_bb (nM=0), correspond to the baseband data extracted from the received RF signal.

Figure 12:
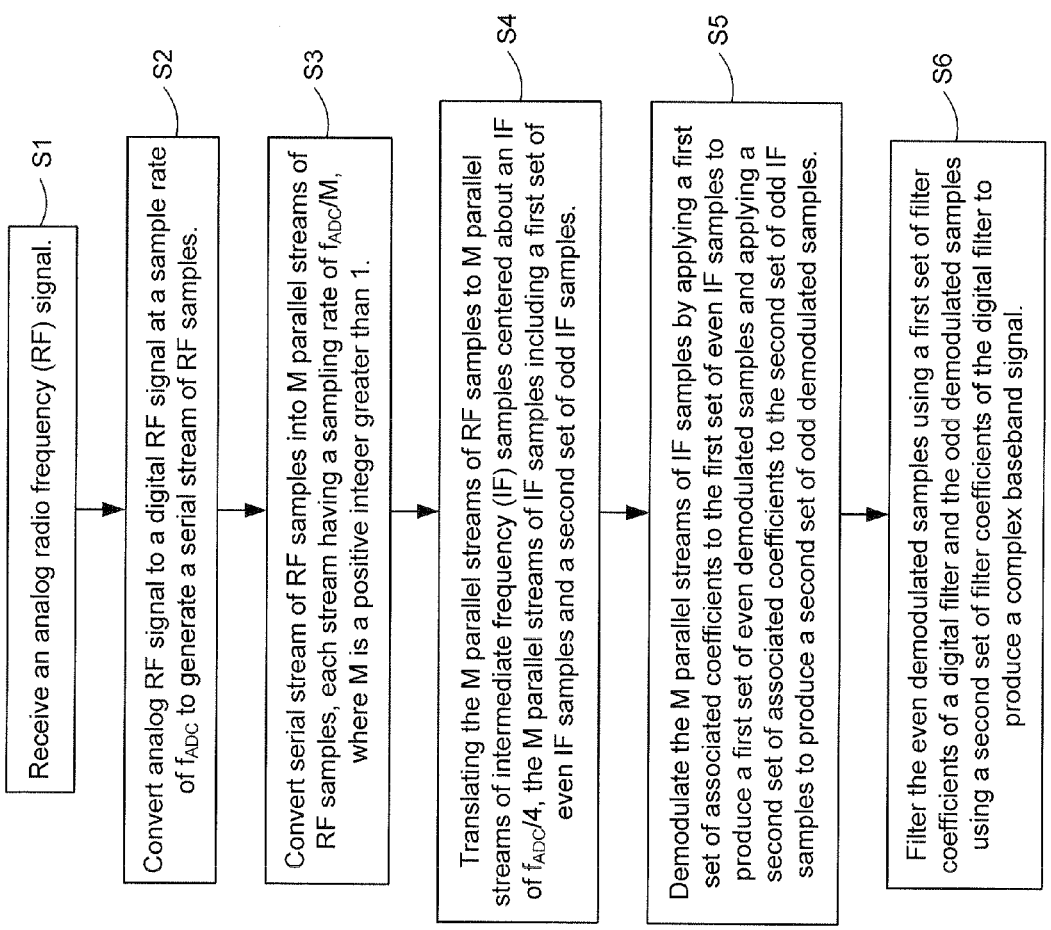
FIG. 12 illustrates a flowchart diagram with non-limiting example procedures for processing a received signal in a digital radio receiver such as the example shown in FIG. 11.

FIG. 12 illustrates a flowchart diagram with non-limiting example procedures for processing a received signal in a digital radio receiver such as the example shown in FIG. 11. An analog radio frequency (RF) signal is received (step S1) and converted to a digital RF signal at a sample rate of $f_{ADC}$ to generate a serial stream of RF samples (step S2). The serial stream of RF samples is converted into M parallel streams of RF samples, each stream having a sampling rate of $f_{ADC}$/M, where M is a positive integer greater than 1 (step S3). The M parallel streams of RF samples are translated to M parallel streams of intermediate frequency (IF) samples centered about an IF of $f_{ADC}$/4, the M parallel streams of IF samples including a first set of even IF samples and a second set of odd IF samples (step S4). The M parallel streams of IF samples are demodulated by applying a first set of associated coefficients to the first set of even IF samples to produce a first set of even demodulated samples and applying a second set of associated coefficients to the second set of odd IF samples to produce a second set of odd demodulated samples (step S5). The even demodulated samples are filtered using a first set of filter coefficients of a digital filter and the odd demodulated samples are filtered using a second set of filter coefficients of the digital filter to produce a complex baseband signal (step S6).

Table 1 below highlights hardware complexity improvements, in terms of the multiplier count, between the architecture shown in FIG. 2 and that in FIG. 11. In the Table 1, the symbol Ntaps represents the number of filter coefficients used to weight (multiply with) the signal in the low-pass filter (also known as the number of filter taps). The various optimizations described above reduce the filtering complexity by 2×M and the demodulation complexity by 2.

TABLE 1

| | Multiplier count | | |
|---|---|---|---|
| | Demodulation | Filtering | Total |
| Original architecture | 2 × M | 2 × M × Ntaps | 2 × M + 2 × M × Ntaps |
| Optimized architecture | M | Ntaps | M + Ntaps |

The result is significant cost, circuit area, and power savings. The fact that the digital receiver can operate at 1/M of the ADC sampling rate allows the hardware to support larger signal bandwidths without trading off power consumption and circuit area. The result is simpler hardware for processing smaller bandwidths.

Figure 13:
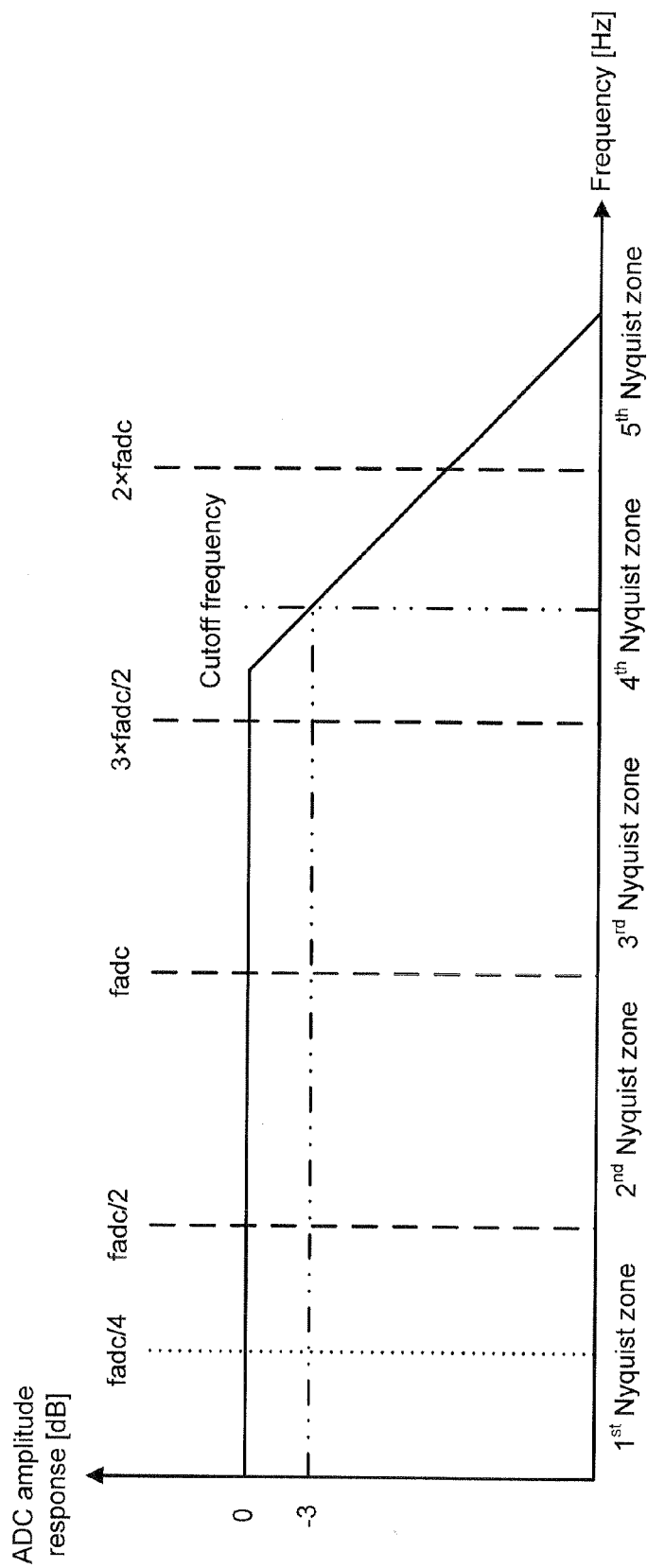
FIG. 13 is a graph illustrating the high-speed ADC analog bandwidth across multiple Nyquist zones.

Another aspect of the technology relates to an example way in which the frequency agility of the digital receiver may be readily configured to operate in any of multiple Nyquist zones or frequency bands. Depending on the ADC analog bandwidth, the digital receiver 18, e.g., as shown in FIG. 11, may be configured to operate in multiple Nyquist zones. FIG. 13 is a graph showing Nyquist zones 1-5 having a bandwidth of $f_{ADC}/2$ in which the first through third Nyquist zones are passed by the ADC analog bandwidth. The first Nyquist zone is centered about $f_{ADC}/4$, the second Nyquist zone is centered about $3f_{ADC}/4$, and the third Nyquist zone is centered about $5f_{ADC}/4$. Different wireless communication standards such as LTE and WCDMA are defined to operate over various frequency bands. These frequency bands may be located in different Nyquist zones for a given ADC operating at a sampling rate fadc.

Figure 14:
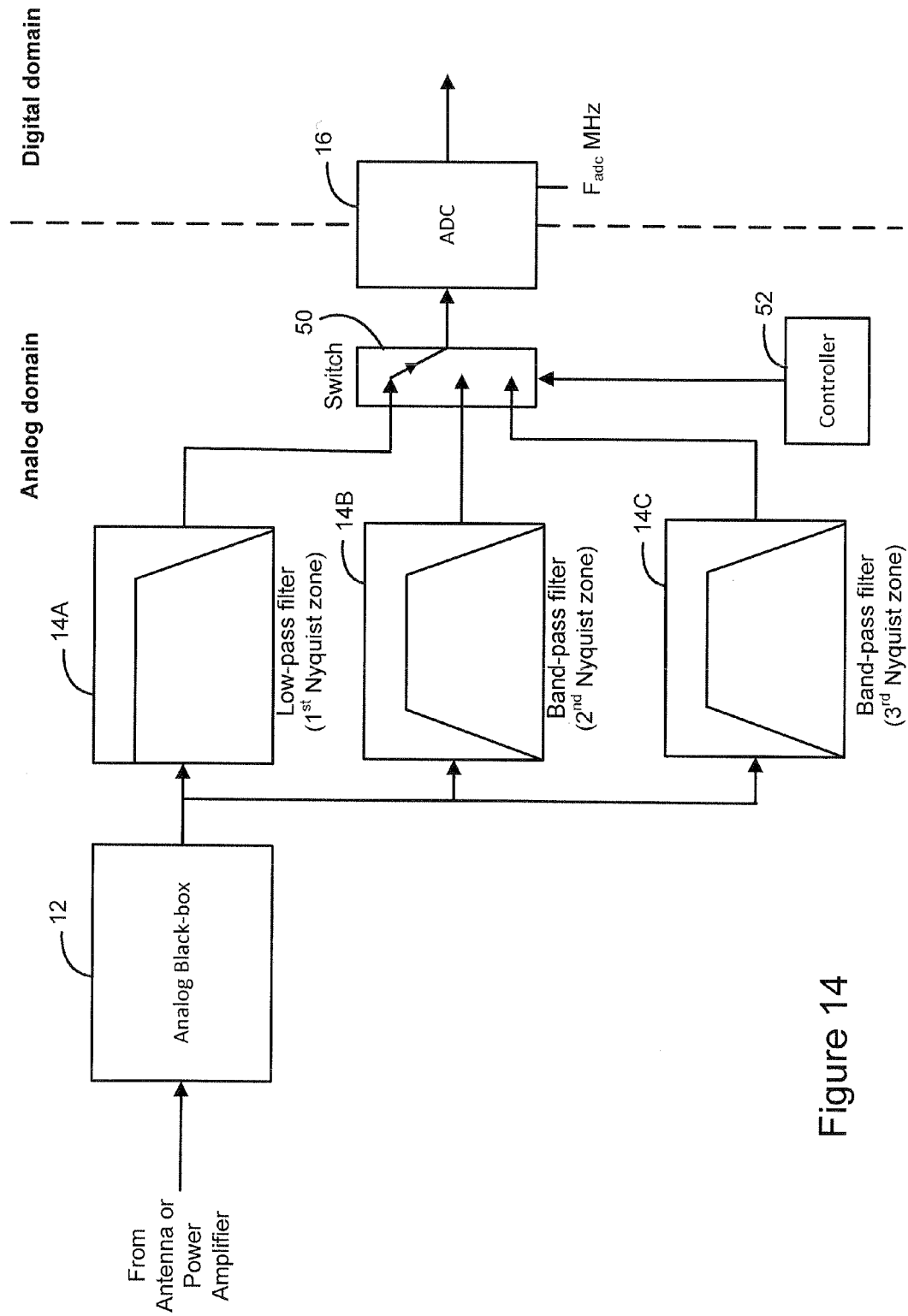
FIG. 14 is a function block diagram that illustrates one example way that one of multiple Nyquist zones of operation for a radio receiver may be selected.

FIG. 14 illustrates an example implementation where the output from the analog black box 12 is provide to each of three filters 14A, 14B, and 14C that correspond to the first, second, and third Nyquist zones. The output from each of the three filters is provided to a switch 50 that selectively provides one of the filter outputs to the ADC 16. A user could change the configuration by manually changing the position of the switch 50. Alternatively, and as shown, a controller 52 may be used to modify the switch position based on one or more user inputs, sensed conditions, detected geographic locations, detected information in received broadcast messages, etc. In the configuration of FIG. 14, the spectrum will be frequency inverted when the received RF signal is in the 2nd Nyquist zone or any even numbered Nyquist zone.

Figure 15:
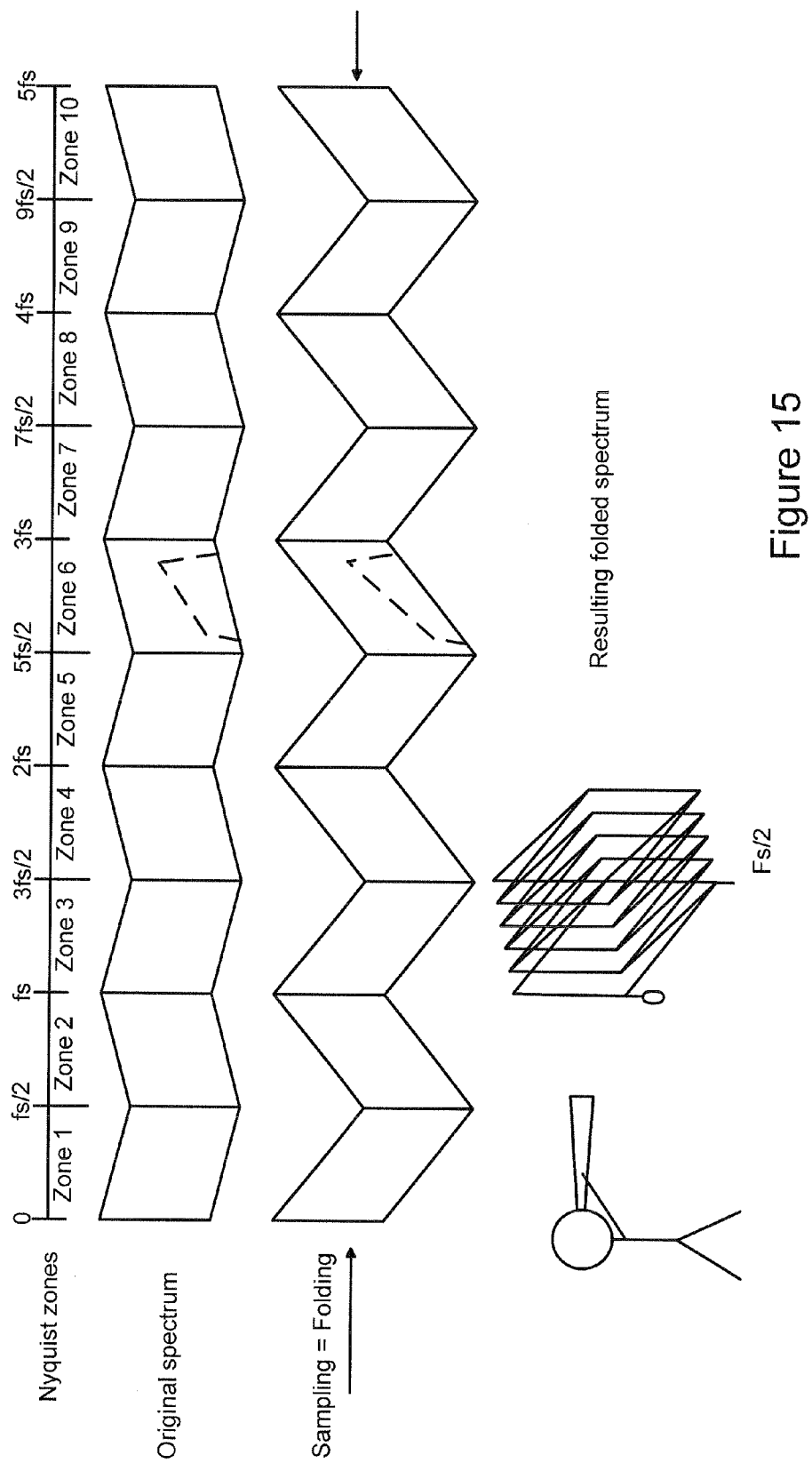
FIG. 15 illustrates the concept of a folded spectrum.

FIG. 15 illustrates the folding process where each Nyquist zone is represented as one section of a foldable paper. Sampling "folds" all the sections, and the folded spectrum is contained in the frequency interval [0–fs/2], i.e., the first Nyquist zone. From FIG. 15, it is apparent that signals located in even-numbered Nyquist zones are inverted when seen from the first Nyquist zone (i.e., where the observer stands in the figure).

This phenomenon can also be explained as follows. Real signals have equi-distant images around 0 Hz. This comes from the Euler theorem which stipulates that:

$$\cos(\theta) = \text{Re}\{e^{j\theta}\} = \frac{e^{j\theta} + e^{-j\theta}}{2}$$

$$\sin(\theta) = \text{Im}\{e^{j\theta}\} = \frac{e^{j\theta} - e^{-j\theta}}{2j}$$

Figure 16:
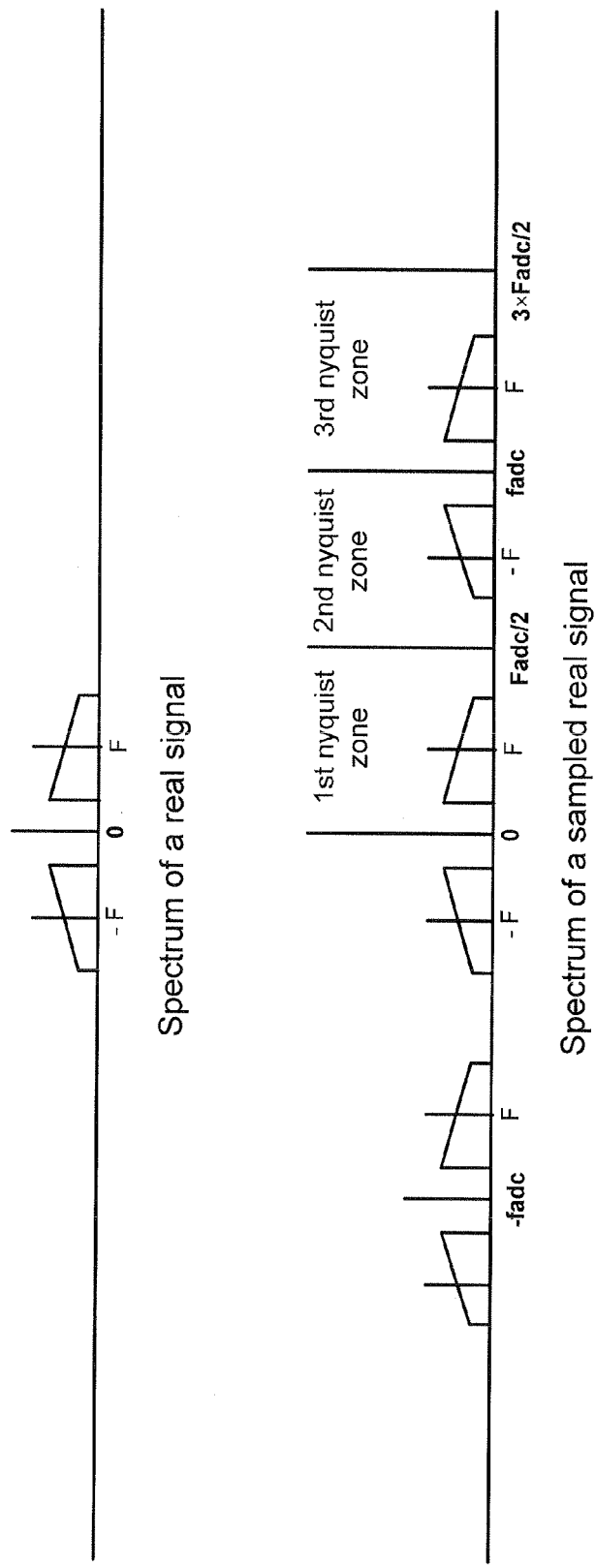
FIG. 16 shows the spectrums of a real signal and a real sampled signal.

These equations show that there is a signal contribution at +θ and another at −θ. Whenever a signal is sampled, there are some spectral repetitions at every multiple of 2π, or equivalently, every multiple of $f_{adc}$. FIG. 16 shows the spectrum of a real signal as well as the spectrum of a sampled real signal with spectral repetitions every multiple of $f_{adc}$.

A sampled waveform can be expressed as:

$$\sin(2\pi ft) = \sin(2\pi fnT_S) = \sin\left(2\pi fn\frac{1}{f_{adc}}\right)$$

where f is the frequency of the signal, t is the time in the analog domain, n is the sample index of the digital waveform, $f_{adc}$ is the ADC sampling frequency in Hz, and $$T_s = \frac{1}{f_{adc}}$$

is the sampling period.

In the case where f>fadc, the frequency f can be re-written as:

$$f = f' + k \times f_{adc}$$

Where k is a positive integer (k=1, 2, 3, . . . ). Once this waveform is sampled at an $f_{adc}$ rate, the expression of the waveform then becomes:

$$\sin\left(2\pi \frac{(f' + k \times f_{adc})}{f_{adc}} n\right) = \sin\left(2\pi \left(\frac{f'}{f_{adc}} + k\right) n\right) = \sin\left(2\pi \frac{f'}{f_{adc}} n + 2\pi nk\right)$$

In the above equation, the term 2πnk will always be a multiple of 2π, because n and k are integers. Sine waves have a period of 2π which means that the following relationship is true:

$$\sin(\omega) = \sin(\omega + 2\pi)$$

Therefore, the waveform expression can be re-written as:

$$\sin\left(2\pi \frac{f'}{f_{adc}} n + 2\pi nk\right) = \sin\left(2\pi \frac{f'}{f_{adc}} n\right)$$

So when f is larger than $f_{adc}$, the sampled waveform appears as a sine wave of lower frequency f' accordingly to the following relationship:

$$f' = f - f_{adc} \left\lfloor \frac{f}{f_{adc}} \right\rfloor$$

where ⌊arg⌋ corresponds to the rounding function towards minus infinity, i.e., the floor function. This phenomenon is called "aliasing" because the signal appears to have a different frequency after sampling; it has been aliased to another frequency.

When a signal is located in an even-numbered Nyquist zone before sampling, it will be aliased to the second Nyquist zone by the sampling process. In other words, the above equation produces a value of f' in the second Nyquist zone. Looking at FIG. 16, it is apparent that the second Nyquist zone corresponds to the negative frequencies of the spectrum centered around $f_{adc}$. The spectrum located in the second Nyquist zone is a mirror image of the spectrum located in the first Nyquist zone with respect to $f_{adc}/2$. Ultimately, the baseband spectrum is only represented in the first Nyquist zone. Therefore, whenever an analog signal is located in an even numbered Nyquist zone before sampling, the spectrum will be frequency inverted (i.e. mirror image) in the first Nyquist zone after sampling.

Figure 17:
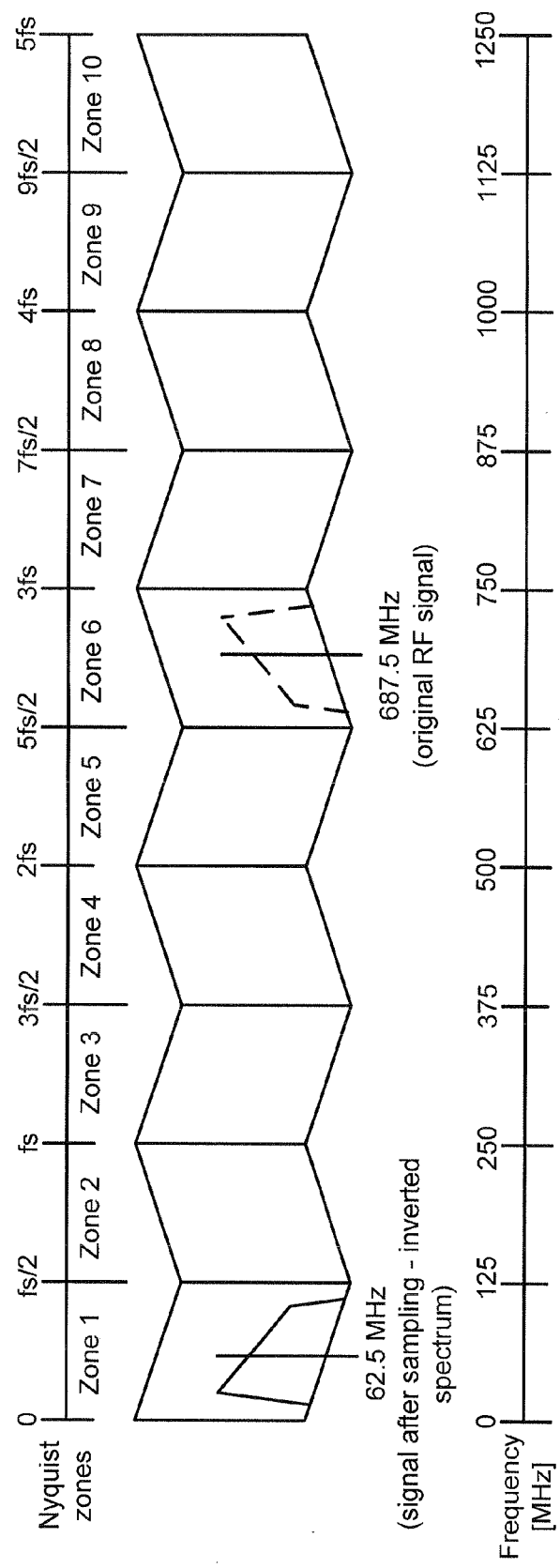
FIG. 17 provides a specific example of a folded spectrum.

FIG. 17 shows a numerical example of the folding process where spectrum inversion happens. Whether the analog RF signal is located in an even-numbered Nyquist zone may be determined for example based on the RF frequency and the ADC sample rate. In such inverted situations, the inversion can be compensated at baseband by swapping the I and the Q streams as shown in block 28 in FIGS. 2 and 3A.

The frequency tuners or mixers in the demodulator 42 move the RF signal of their respective branches to the intermediate frequency (IF) of $f_{adc}/4$. The tuning frequency $f_{tune}$ (also shown as $\omega_{tune}$) is a key parameter of the receiver configuration. One example way to calculate $f_{tune}$ now described. First, the aliased version of the RF carrier is determined. If the RF carrier is located in an odd Nyquist zone, equation (1) is used to determine the aliased version of the RF carrier. If the RF carrier is located in an even Nyquist zone, equation (2) is used to determine the aliased version of the RF carrier.

$$f_{carrier\_aliased} = f_{carrier} - f_{ADC} \left\lfloor \frac{f_{carrier}}{f_{ADC}} \right\rfloor \quad (1)$$

$$f_{carrier\_aliased} = f_{ADC} - \left( f_{carrier} - f_{ADC} \left\lfloor \frac{f_{carrier}}{f_{ADC}} \right\rfloor \right) \quad (2)$$

where the function $\lfloor arg \rfloor$ denotes the greatest integer smaller than the argument.

Second, the tuning frequency $f_{tune}$ with respect to the aliased carrier frequency is calculated as follows:

$$f_{tune} = f_{carrier\_aliased} - \frac{f_{ADC}}{4} \quad (3)$$

Thus, a frequency-agile digital receiver can be tuned to accommodate various signal frequencies and bandwidths.

Example initial steps for designing frequency-agile digital receiver that only need to be done once may include:
1. Select ADC (analog bandwidth, maximum sampling frequency, linearity, etc).
2. Specify the ADC sampling frequency $f_{ADC}$.
3. Design RF filters for every available Nyquist zones, depending on the ADC analog bandwidth and the sample rate $f_{ADC}$.
4. Select the digital hardware parallelization coefficient M. The baseband rate $f_{ADC}/M$ is preferably large enough to support a worst case bandwidth. Also preferably, the coefficient M is an even number.
5. Design and implement the system.

The following example steps may be used to selectably tune the frequency-agile radio receiver to various frequencies and bandwidths:
1. Determine the Nyquist zone of the RF signal to be received and configure RF switch to select the output of the appropriate analog filter, e.g., select one of filters 14A-14C.
2. Determine the tuning frequency ($f_{tune}$) depending on Nyquist zone and program the sine wave values to the digital hardware. Negate the $3^{rd}$ and the $4^{th}$ coefficient values out of every four coefficients to implement the $f_{ADC}/4$ demodulation as explained above.
3. Determine the signal bandwidth, and based thereon, determine the low-pass filter coefficients.
4. Scale the baseband signal by a coefficient of 2.
5. If the RF spectrum is located in an even Nyquist zone, swap the baseband I and Q streams to flip the spectrum back.

There are multiple advantages provided by this technology including, for example, reduced computing requirements on demodulation and filtering in general, compact and optimized implementation, and lower sample rates making for easier hardware implementation and enabling power savings during operation. Demodulation complexity is reduced by a coefficient of 2 as compared to implementation at $f_{ADC}/M$. Filter complexity is reduced by a coefficient of 2×M as compared to implementation at $f_{ADC}/M$. The technology may be also used to advantage even when the initial sample rate ($f_{adc}$) is achievable using existing technologies. In addition, a configurable digital receiver is provided that can be tuned for different frequencies and bandwidths because the receiver can be switched to operate in different Nyquist zones. That receiver is also a direct-RF receiver with a low noise figure as well as a low complexity and a low processing rate.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method for use in a radio receiver, comprising the steps of:
   receiving an analog radio frequency (RF) signal;
   converting the analog RF signal to a digital RF signal at a sample rate of $f_{ADC}$ to generate a serial stream of RF samples;
   converting the serial stream of RF samples into M parallel streams of RF samples, each stream having a sampling rate of $f_{ADC}/M$, where M is a positive integer greater than 1;
   translating the M parallel streams of RF samples to M parallel streams of intermediate frequency (IF) samples centered about an IF of $f_{ADC}/4$, the M parallel streams of IF samples including a first set of even IF samples and a second set of odd IF samples;
   demodulating the M parallel streams of IF samples by applying a first set of associated coefficients to the first set of even IF samples to produce a first set of even demodulated samples and applying a second set of associated coefficients to the second set of odd IF samples to produce a second set of odd demodulated samples; and filtering the even demodulated samples using a first set of filter coefficients of a digital filter and the odd demodulated samples using a second set of filter coefficients of the digital filter to produce a complex baseband signal.

2. The method in claim 1, wherein the associated coefficients are based on the IF of $f_{ADC}/4$.

3. The method in claim 1, wherein the even demodulated samples represent real components of the baseband complex signal and the odd demodulated samples represent imaginary components of the complex baseband signal.

4. The method in claim 1, wherein the associated coefficients include 1 and −1 or 2 and −2.

5. The method in claim 1, wherein M is an even number.

6. The method in claim 1, wherein the filtering step implements an N-tap finite impulse response (FIR) filter, where N is a positive integer, using block digital filtering with two parallel filtering paths with one of the filtering paths operating at 1/M of the sampling frequency on the first set of even baseband samples using even phases of the N-tap FIR filter and the other of the filtering paths operating at 1/M of the sampling frequency on the second set of odd baseband samples using odd phases of the N-tap FIR filter.

7. The method in claim 1, further comprising decimating the complex baseband signal within the filtering step.

8. The method in claim 7, further comprising decimating the complex baseband signal within the filtering step by filtering only a subset of the even and odd demodulated samples, each subset corresponding to a number of samples required for a desired decimation.

9. The method in claim 1, further comprising:
determining the first and second sets of filter coefficients based on a desired signal bandwidth for the radio receiver to receive RF signals.

10. The method in claim 1, wherein the radio receiver is selectively operable in different Nyquist zones of operations.

11. The method in claim 10, further comprising:
determining a selected one of the Nyquist zones;
operating the radio receiver to receive in the selected Nyquist zone.

12. The method in claim 11, further comprising:
calculating an aliased version of an RF carrier located in the selected Nyquist zone, and
calculating a tuning frequency for aliased version of an RF carrier which can be used to translate the aliased version of an RF carrier to $f_{ADC}/4$.

13. The method in claim 12, wherein if the selected Nyquist zone is an even Nyquist zone, the method further comprises swapping the even baseband samples with the odd baseband samples.

14. Apparatus for use in a radio receiver chain, where the radio receiver chain includes an analog-to-digital converter for converting the analog RF signal to a digital RF signal at a sample rate of $f_{ADC}$ to generate a serial stream of RF samples, the apparatus comprising:
a serial-to-parallel converter configured to convert the serial stream of RF samples into M parallel streams of RF samples, each stream having a sampling rate of $f_{ADC}/M$, where M is a positive integer greater than 1;
signal processing circuitry configured to translate the M parallel streams of RF samples to M parallel streams of intermediate frequency (IF) samples centered about an IF of $f_{ADC}/4$, the M parallel streams of IF samples including a first set of even IF samples and a second set of odd IF samples and to demodulate the M parallel streams of IF samples by applying a first set of associated coefficients to the first set of even IF samples to produce a first set of even demodulated samples and applying a second set of associated coefficients to the second set of odd IF samples to produce a second set of odd demodulated samples; and
a filter configured to filter the even demodulated samples using a first set of filter coefficients of a digital filter and the odd demodulated samples using a second set of filter coefficients of the digital filter to produce a complex baseband signal.

15. The apparatus in claim 14, wherein the associated coefficients are based on the IF of $f_{ADC}/4$.

16. The apparatus in claim 14, wherein the even demodulated samples represent real components of the baseband complex signal and the odd demodulated samples represent imaginary components of the complex baseband signal.

17. The apparatus in claim 14, wherein the associated coefficients include 1 and −1 or 2 and −2.

18. The apparatus in claim 14, wherein M is an even number.

19. The apparatus in claim 14, wherein the filter is an N-tap finite impulse response (FIR) filter, where N is a positive integer, that uses block digital filtering with two parallel filtering paths with one of the filtering paths operable at 1/M of the sampling frequency on the first set of even baseband samples using even phases of the N-tap FIR filter and the other of the filtering paths operable at 1/M of the sampling frequency on the second set of odd baseband samples using odd phases of the N-tap FIR filter.

20. The apparatus in claim 19, wherein the signal processing circuitry only requires N multipliers and N−2 adders.

21. The apparatus in claim 14, wherein the filter is configured to decimate the complex baseband signal by filtering only a subset of the even and odd demodulated samples, each subset corresponding to a number of samples required for a desired decimation.

22. A frequency-agile radio receiver system, comprising:
an analog input for receiving an analog radio frequency (RF) signal;
an analog-to-digital converter for converting the analog RF signal to a digital RF signal at a sample rate of $f_{ADC}$ to generate a serial stream of RF samples;
a serial-to-parallel converter configured to convert the serial stream of RF samples into M parallel streams of RF samples, each stream having a sampling rate of $f_{ADC}/M$, where M is a positive integer greater than 1;
signal processing circuitry configured to translate the M parallel streams of RF samples to M parallel streams of intermediate frequency (IF) samples centered about an IF of $f_{ADC}/4$, the M parallel streams of IF samples including a first set of even IF samples and a second set of odd IF samples and to demodulate the M parallel streams of IF samples by applying a first set of associated coefficients to the first set of even IF samples to produce a first set of even demodulated samples and applying a second set of associated coefficients to the second set of odd IF samples to produce a second set of odd demodulated samples; and
a filter configured to filter the even demodulated samples using a first set of filter coefficients of a digital filter and the odd demodulated samples using a second set of filter coefficients of the digital filter to produce a complex baseband signal.

23. The frequency-agile radio receiver system in claim 22, further comprising an antenna coupled to provide the analog RF signal to the analog input.

24. The frequency-agile radio receiver system in claim 22, wherein the radio receiver is selectively operable in different Nyquist zones of operations.

25. The frequency-agile radio receiver system in claim 22, further comprising swapping circuitry configured to swapping the even baseband samples with the odd baseband samples if a selected one of the Nyquist zones is an even Nyquist zone.

26. The frequency-agile radio receiver system in claim 22, further comprising:
   multiple selectable filters, each corresponding to a different Nyquist zone of operation for filtering the analog RF signal;
   a switch configured to receive outputs from each of the selectable filters;
   a controller configured to control the switch to provide one of the filter outputs to the analog-to-digital converter.

27. The frequency-agile radio receiver system in claim 26, wherein the signal processing circuitry is configured to calculate an aliased version of an RF carrier located in a selected one of the Nyquist zones and to calculate a tuning frequency for aliased version of an RF carrier which can be used to translate the aliased version of an RF carrier to $f_{ADC}/4$.

28. The frequency-agile radio receiver system in claim 22, wherein the first and second sets of filter coefficients are based on a desired signal bandwidth for the radio receiver to receive RF signals.

* * * * *